(12) United States Patent
Keil et al.

(10) Patent No.: US 8,321,618 B1
(45) Date of Patent: Nov. 27, 2012

(54) MANAGING CONFLICTS ON SHARED L2 BUS

(75) Inventors: Shane Keil, Santa Clara, CA (US); John H. Edmondson, Arlington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 684 days.

(21) Appl. No.: 12/510,987

(22) Filed: Jul. 28, 2009

(51) Int. Cl.
*G06F 13/00* (2006.01)

(52) U.S. Cl. .......................... 710/310; 710/317; 711/168

(58) Field of Classification Search .................. 711/150, 711/167, 168; 710/117, 240, 244, 301, 317
See application file for complete search history.

(56) References Cited

U.S. PATENT DOCUMENTS

| | | | |
|---|---|---|---|
| 5,727,167 A | 3/1998 | Dwyer, III et al. | |
| 5,740,402 A | 4/1998 | Bratt et al. | |
| 5,862,385 A * | 1/1999 | Iitsuka ........................ | 717/156 |
| 6,215,497 B1 | 4/2001 | Leung | |
| 6,349,382 B1 | 2/2002 | Feiste et al. | |
| 6,571,315 B2 | 5/2003 | Campbell | |
| 6,711,654 B2 | 3/2004 | Rangan | |
| 7,188,219 B2 | 3/2007 | Jeddeloh | |
| 7,213,087 B1 | 5/2007 | Bertone et | |
| 7,343,477 B1 | 3/2008 | Thatipelli et al. | |
| 7,373,467 B2 | 5/2008 | Hughs | |
| 7,493,439 B2 * | 2/2009 | Gower et al. ................ | 710/305 |
| 7,730,283 B2 | 6/2010 | Luick | |
| 7,769,957 B2 | 8/2010 | Vishin et al. | |
| 7,844,758 B1 | 11/2010 | Hughs | |
| 8,060,700 B1 * | 11/2011 | Glasco et al. ................ | 711/133 |
| 2005/0033922 A1 | 2/2005 | Jeddeloh | |
| 2006/0123142 A1 | 6/2006 | Duncan et al. | |
| 2006/0123152 A1 | 6/2006 | Koch et al. | |
| 2008/0059828 A1 | 3/2008 | Siggelkow et al. | |
| 2009/0083489 A1 | 3/2009 | Clark et al. | |
| 2009/0138682 A1 | 5/2009 | Capps et al. | |
| 2009/0249352 A1 | 10/2009 | Hohensee | |

OTHER PUBLICATIONS

Tam, et al., "Managing Shared L2 Caches on Multicore Systems in Software", 2005, University of Toronto, 8 pages.
Office Action, U.S. Appl. No. 12/510,985 dated Dec. 23, 2010.
Office Action dated Sep. 19, 2011 from U.S. Appl. No. 12/510,985.

* cited by examiner

*Primary Examiner* — Glenn A Auve
(74) *Attorney, Agent, or Firm* — Patterson & Sheridan, LLP

(57) ABSTRACT

One embodiment of the present invention sets forth a mechanism to schedule read data transmissions and write data transmissions to/from a cache to frame buffer logic on the L2 bus. When processing a read or a write command, a scheduling arbiter examines a bus schedule to determine that a read-read conflict, a read-write conflict or a write-read exists, and allocates an available memory space in a read buffer to store the read data causing the conflict until the read return data transmission can be scheduled. In the case of a write command, the scheduling arbiter then transmits a write request to a request buffer. When processing a write request, the request arbiter examines the request buffers to determine whether a write-write conflict. If so, then the request arbiter allocates a memory space in a request buffer to store the write request until the write data transmission can be scheduled.

25 Claims, 12 Drawing Sheets

MANAGING CONFLICTS ON SHARED L2 BUS

BACKGROUND OF THE INVENTION

1. Field of the Invention

The present invention relates generally to the field of data transmission and, more specifically, to managing conflicts on a shared L2 data bus.

2. Description of the Related Art

One element of a memory subsystem within certain processing units is a Level 2 Cache memory (referred to herein as "L2 cache"). The L2 cache is a large on-chip memory that temporarily stores data being used by the various clients. This data may be retrieved from or written to many partitions of an external memory (each such partition referred to herein as a "DRAM"). A memory controller (referred to herein as "DRAM controller") manages the flow of data being transmitted to or retrieved from the DRAM.

Typically, data being transmitted between the L2 cache and the DRAM is transmitted over an L2 bus. At any given clock cycle, the L2 bus maybe used to transmit write data from the L2 cache to one DRAM or read data from one DRAM to the L2 cache. Because processing of read and write commands received from the L2 cache to the different DRAMs happens concurrently, at a given clock cycle, more than one DRAM may need to access the L2 bus to transmit read or write data. In such a situation, a conflict occurs on the L2 bus.

More specifically, a read-read conflict occurs when two or more DRAMs need to transmit read data to the L2 cache at the same clock cycle. A write-write conflict occurs when two or more DRAMs need to retrieve write data from the L2 cache at the same clock cycle. Lastly, a read-write conflict occurs when one DRAM needs to transmit read data to the L2 cache while another DRAM needs to retrieve write data from the L2 cache. Further, read data associated with a read command is usually returned from the DRAM several clock cycles after the transmission of the read command to that DRAM, and write data associated with a write command is transmitted to the DRAM with the actual write command. Because write data needs to be retrieved from the L2 cache and read data needs to be returned to the L2 cache, a read-write conflict may occur on the L2 bus when the DRAM switches from processing read commands to processing write commands.

If these different conflicts on the L2 bus are not properly managed, the read and write commands may be stalled, resulting in a decrease of overall system performance.

As the foregoing illustrates, what is needed in the art is an effective mechanism for managing conflicts on the L2 bus when processing read and write commands between the L2 cache and the various external DRAMs.

SUMMARY OF THE INVENTION

One embodiment of the present invention sets forth a method for scheduling a read return data transmission on a bus that couples an intermediary cache to frame buffer logic, where the frame buffer logic couples the intermediary cache to an external memory, and the read return data transmission involves transmitting read return data associated with a read command and retrieved from the external memory from the frame buffer logic to the intermediary cache. The method includes the steps of determining a target clock cycle at which the read return data transmission should be scheduled on the bus, examining a bus schedule to determine that a conflict on the bus exists between the read return data transmission and a previously scheduled data transmission at the target clock cycle, resolving the conflict by consuming at least a portion of memory space available in the first buffer or a second buffer in the frame buffer logic for storing data retrieved from the external memory, and, after resolving the conflict, transmitting the read command to the external memory to retrieve the read return data.

Another embodiment of the present invention sets forth a method for scheduling a write data transmission on a bus that couples an intermediary cache to frame buffer logic, where the frame buffer logic couples the intermediary cache to an external memory, and the write data transmission involves transmitting write data associated with a write command from the intermediary cache to the frame buffer logic. The method includes the steps of determining a target clock cycle at which the write data transmission should be scheduled on the bus, determining that a first conflict on the bus exists between the write data transmission and a second data transmission at the target clock cycle, resolving the first conflict by consuming at least a portion of memory space available in a first buffer, a second buffer or a third buffer in the frame buffer logic, where the first buffer stores read return data, and the second buffer and the third buffer store requests, and, after resolving the first conflict, transmitting a write data request to the intermediary cache for retrieving the write data so that the write data can be transmitted on the bus to the frame buffer logic via the write data transmission, and updating a bus schedule to schedule the write data transmission on the bus.

Other embodiments of the present invention include systems and computing devices configured to implement at least portions of the methods set forth above.

One advantage of the disclosed methods is that available memory space in the read return data buffers can be allocated to store read return data that should be transmitted to the L2 cache at a specific clock cycle when a conflict exists on the L2 bus at that specific clock cycle. Such a mechanism reduces the number of read or write commands that are stalled by the scheduling arbiter because the data transmissions associated with those read or write commands can not be scheduled due to conflicts on the L2 bus.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
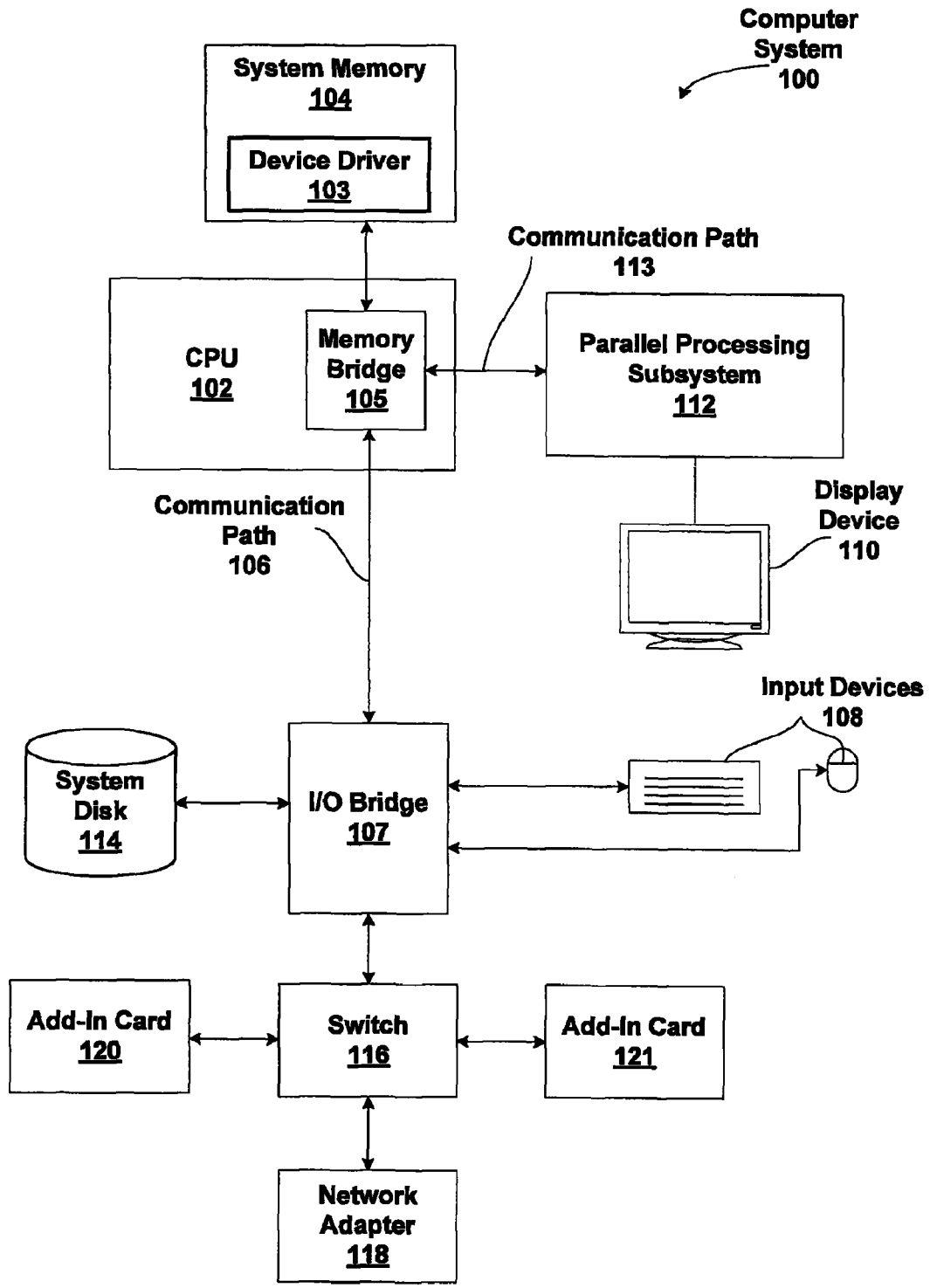
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
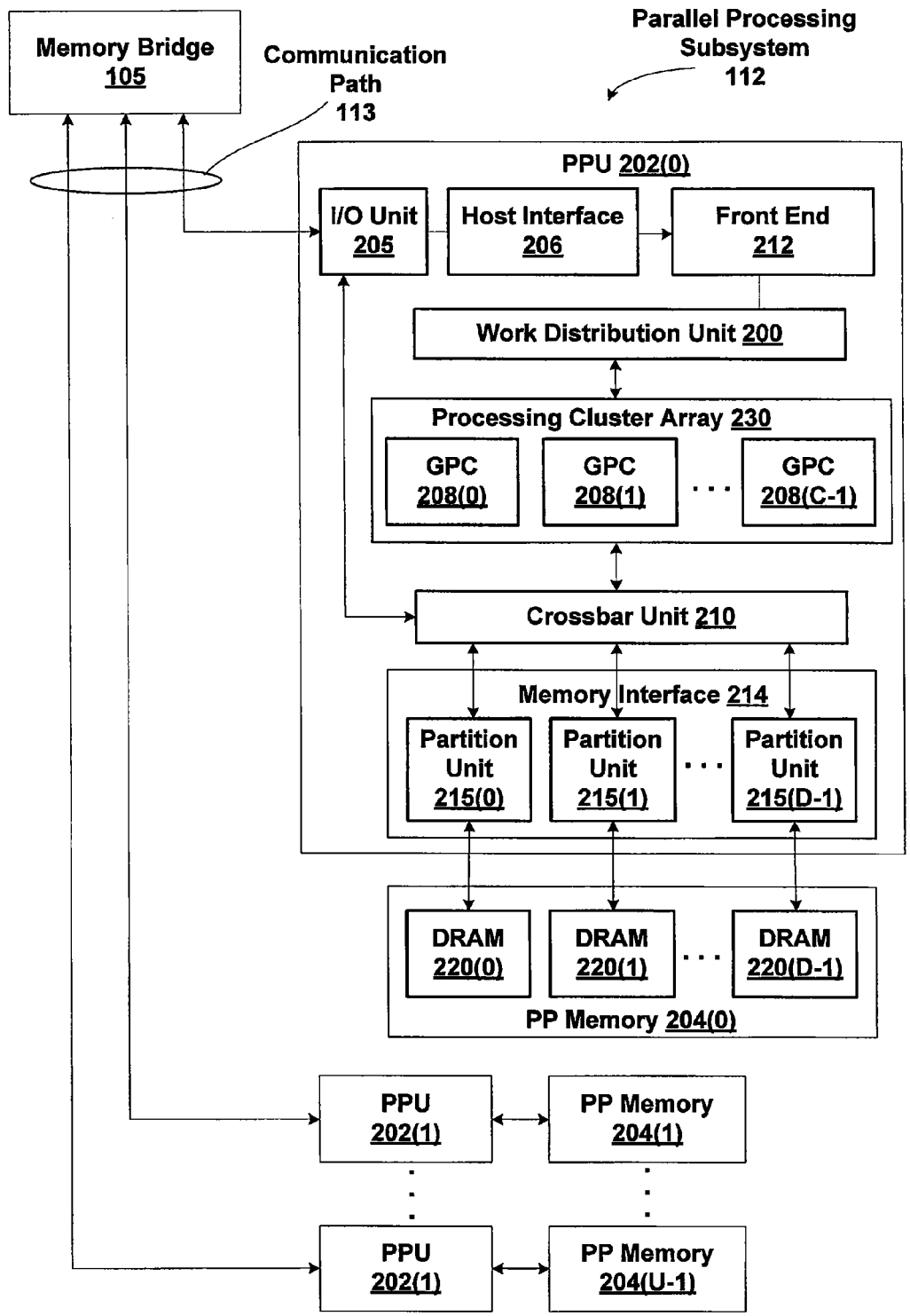
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≧1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
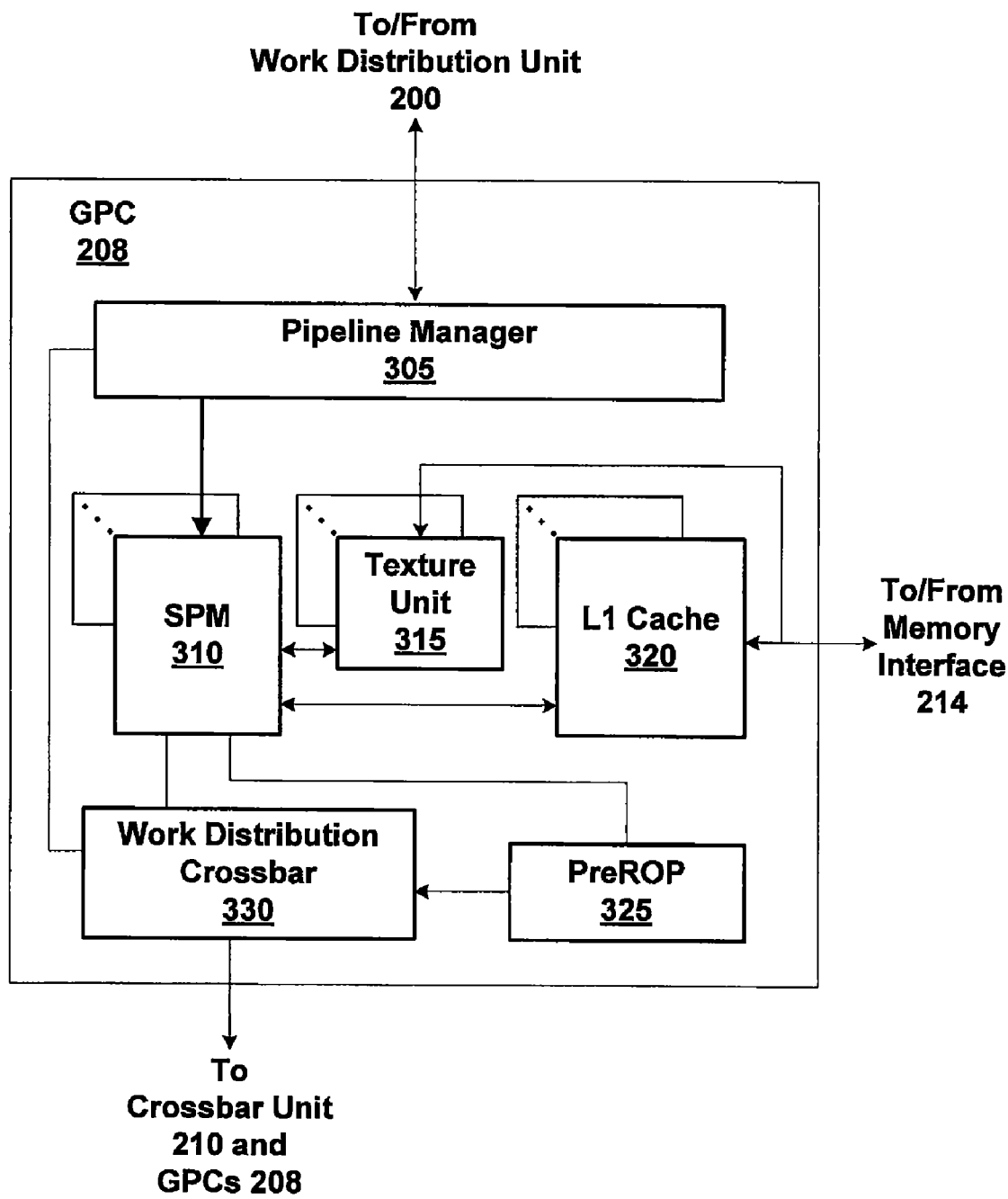
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≧1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
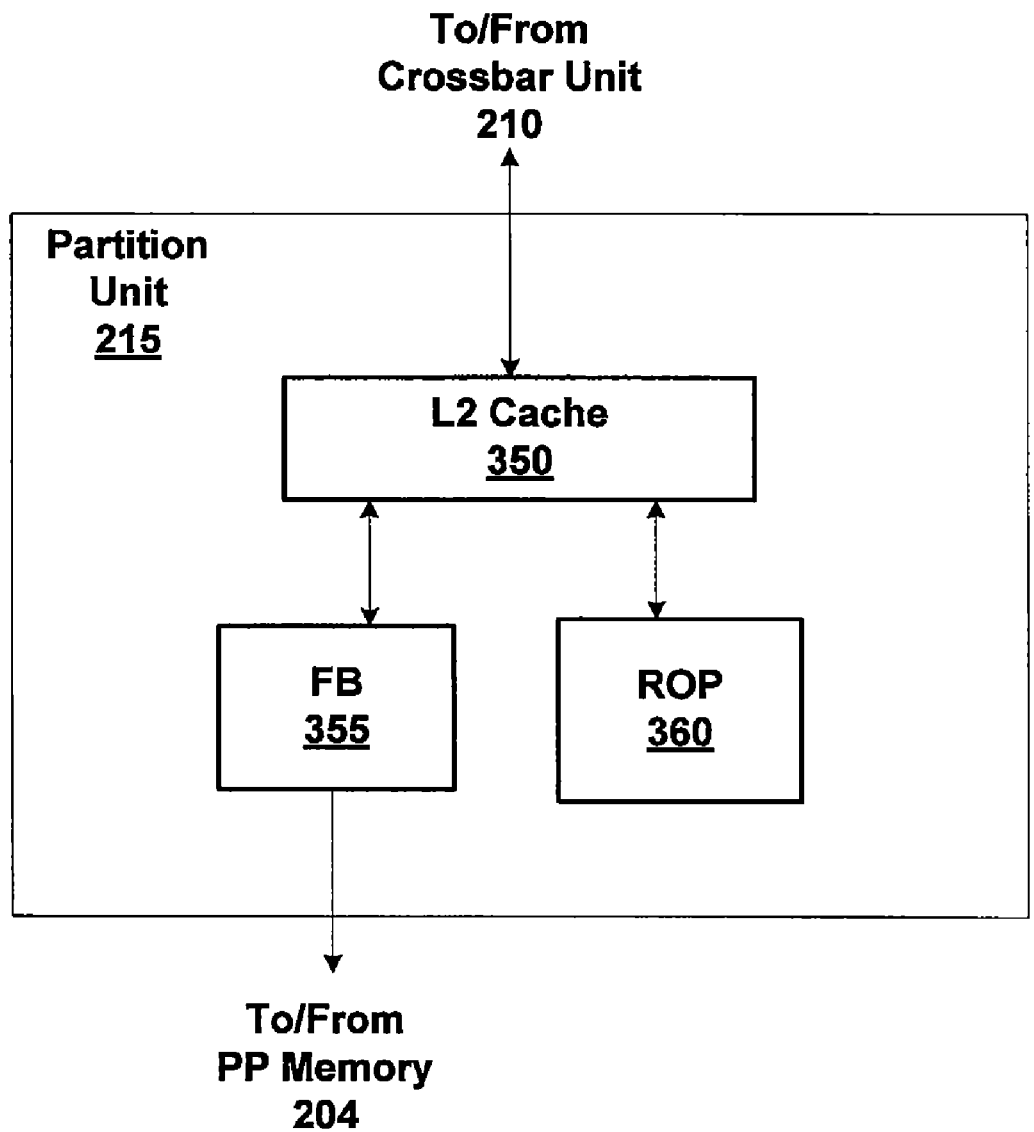
FIG. 3B is a block diagram of a partition unit within one of the PPUs of FIG. 2, according to one embodiment of the present invention.

FIG. 3B is a block diagram of a partition unit 215 within on of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Managing L2 Bus Conflicts

Figure 4:
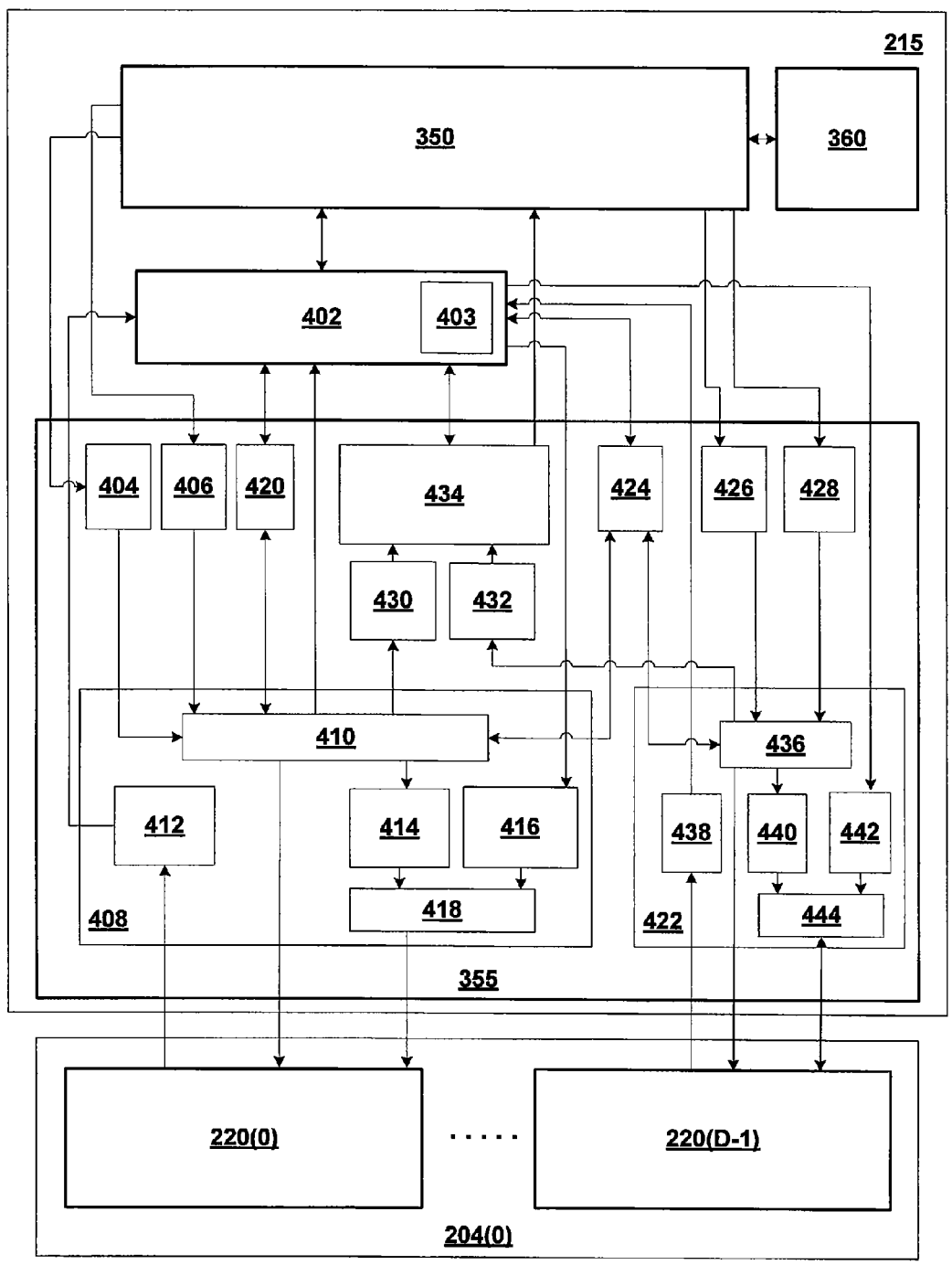
FIG. 4 is a detailed block diagram of the frame buffer logic in the partition unit of FIG. 3B, according to one embodiment of the present invention.

FIG. 4 is a detailed block diagram of the frame buffer logic 355 in the partition unit 215 of FIG. 3B, according to one embodiment of the present invention. As shown, the L2 cache 350 and the frame buffer logic 355 are connected via an L2 bus 402. As also shown, the frame buffer logic 355 includes a read command buffer 404, a write command buffer 406, a first DRAM controller 408, a credit count 420, a second DRAM controller 422, a credit count 424, a write command buffer 426, a read command buffer 428, a write data request buffer 430, a write data request buffer 432 and a write data request arbiter 434.

In operation, the L2 cache 350 receives read and write commands from different clients within the parallel processing subsystem 112, such as the GPCs 208 and the ROP 360. In response to a read command, the L2 cache 350 transmits the data associated with the read command to the client that transmitted the read command. If the data associated with the read command is not stored in the L2 cache 350, then the L2 cache 350 transmits the read command to the frame buffer logic 355 to request that data. The frame buffer logic 355 then retrieves the data associated with the read command from a corresponding partition of the DRAM 220 and transmits the data to the L2 cache 350 via the L2 bus 402. In response to a write command, the L2 cache 350 stores the data associated with the write command and transmits the write command to the frame buffer logic 355. The frame buffer logic 355 then retrieves the data associated with the write command stored in the L2 cache via the L2 bus 402 and transmits that data to a corresponding partition of the DRAM 220 for storage.

At any given clock cycle, the L2 bus 402 may transmit data associated with a read command from the frame buffer logic 355 to the L2 cache 350 or data associated with a write command from the L2 cache 350 to the frame buffer logic 355. The L2 bus 402 includes a bus schedule 403 that stores the schedule of data transmissions to/from the L2 cache 350 from/to the frame buffer logic 355. The bus schedule 403 stores a list of scheduled data transmissions including the source and destination of the data transmission as well as the clock cycle at which the transmission is scheduled.

Each read/write command received from the L2 cache 350 includes a memory address identifying a specific location within a bank page of one of the partitions of the DRAM 220 from/to where data associated with the command is read/written. For the purposes of this discussion only, it is assumed that the frame buffer logic 355 receives read and write commands associated with two partitions of the DRAM 220, DRAM 220(0) and DRAM 220(D−1). A read command received from the L2 cache 350 associated with the DRAM 220(0) is stored in the read command buffer 404. A write command received from the L2 cache 350 associated with the DRAM 220(0) is stored in the write command buffer 406. The read command buffer 404 and the write command buffer 406 store the read and write commands until the read and write commands are selected for processing by the first DRAM controller 408. A read command received from the L2 cache 350 associated with the DRAM 220(D−1) is stored in the read command buffer 428. A write command received from the L2 cache 350 associated with the DRAM 220(D−1) is stored in the write command buffer 426. The read command buffer 428 and the write command buffer 426 store the read and write commands until the read and write commands are selected for processing by the second DRAM controller 408.

The first DRAM controller 408 is coupled to the DRAM 220(0) and includes a scheduling arbiter 410, a read return data buffer 412, a write command latency buffer 414, a write data buffer 416 and a write command issuer 418. The second DRAM controller 422 is coupled to the DRAM 220(D−1) and also includes a scheduling arbiter 436, a read return data buffer 438, a write command latency buffer 440, a write data buffer 442 and a write command issuer 444. As persons skilled in the art will appreciate, the components of the second DRAM controller 422 are functionally equivalent to their counterpart components in the first DRAM controller 408, thereby providing the second DRAM controller 422 with substantially similar overall functionality as that of the first DRAM controller 408. The overall functionality of the first DRAM controller 408, as well as the individual functionalities of the constituent components of the first DRAM controller 409, are described below in the context of scheduling data transmissions associated with read and write commands such that conflicts on the L2 bus 402 are avoided.

The scheduling arbiter 410 selects read and write commands stored in the read command buffer 404 and the write command buffer 406 in any technically feasible fashion. In one embodiment, the scheduling arbiter 410 implements a round-robin technique when selecting read/write commands from the read command buffer 404 and the write command buffer 406. When processing a selected read command, the scheduling arbiter 410 first determines whether a transmission of the data associated with the read command stored in the DRAM 220(0) (herein referred to as "read return data transmission") can be scheduled on the L2 bus 402. As is well known, the DRAM 220(0) transmits read return data at a pre-determined number of clock cycles (herein referred to as the "target clock cycle") after the read command is issued to the DRAM 220(0). The scheduling arbiter 410 examines the bus schedule 403 in the L2 bus 402 to determine whether another data transmission is scheduled on the L2 bus 402 at the target clock cycle. If no data transmission is scheduled at the target clock cycle, then no conflicts exists, and the scheduling arbiter 410 updates the bus schedule 403 stored within the L2 bus 402 to schedule the read return data transmission. The scheduling arbiter 410 then transmits the read command to the DRAM 220(0) for processing. In response to the read command, the DRAM 220(0) transmits the read return data to the read return data buffer 412 at the target clock cycle. The L2 bus 402 retrieves the read return data from the read return data buffer 412 and transmits the read return data to the L2 cache 350 for further processing at the target clock cycle. If, however, the scheduling arbiter 410 determines that another data transmission is already scheduled on the L2 bus 402 at the target clock cycle, then the scheduling arbiter 410 determines whether that scheduled data transmission is a write data transmission from the L2 cache 350 to the frame buffer logic 355 (creating a read-write conflict) or a read return data transmission from the frame buffer logic 355 to the L2 cache 350 (creating a read-read conflict).

With respect to a read-write conflict, such a conflict occurs when write data is scheduled for transmission from the L2 cache 350 to either the first DRAM controller 408 or the second DRAM controller 422 at the target clock cycle. In such a case, the scheduling arbiter 410 retrieves the count stored in the credit count 420, which indicates the number of credits available to store read return data in the read return data buffer 412. Each credit reflects one unit of memory space within the read return data buffer 412 that is available to store read return data associated with a single read command received from the DRAM 220(0). If the count stored in the credit count 420 is equal to zero, indicating that no memory space is available in the read return data buffer 412 to store read return data then the scheduling arbiter 410 stalls the read command and attempts to schedule the associated read return data transmission at the next clock cycle. If, however, the count stored in the credit count 420 is greater then zero, then the scheduling arbiter 410 decrements the count stored in the credit count 420, indicating the consumption of a credit. The scheduling arbiter 410 then transmits the read command to the DRAM 220(0) for processing without scheduling the read return data transmission on the L2 bus 402. In response to the read command, the DRAM 220(0) transmits the read return data to the read return data buffer 412 at the target clock cycle. Because the read return data transmission is not scheduled on the L2 bus 402 at the target clock cycle, the read return data is stored in the read return data buffer 412 until the read return data can be transmitted to the L2 cache 350 at a later clock cycle, thereby resolving the read-write conflict.

With respect to a read-read conflict, such a conflict occurs when a read return data transmission from the second DRAM controller 422 is scheduled on the L2 bus 402 at the target clock cycle. In such cases, the scheduling arbiter 410 retrieves the count stored in the credit count 420 and the credit count 424. As previously described, the count stored in the credit count 420 indicates the number of credits available in the read return data buffer 412 to store read return data. Similarly, the count stored in the credit count 424 indicates the number of credits available in a read return data buffer 438 in the second DRAM controller 422. If the counts stored in both the credit count 420 and the credit count 424 are equal to zero, then the scheduling arbiter 410 stalls the read command and attempts to schedule the associated read return data transmission at the next clock cycle. If, however, the count stored in either the credit count 420 or the credit count 424 is not equal to zero, then the scheduling arbiter 410 compares the counts to determine which of the counts is greater.

If the count stored in the credit count 420 is greater than the count stored in the credit count 424, then the available memory space in the read return data buffer 412 is greater than the available memory space in the read return data buffer 438. In such a situation, the scheduling arbiter 410 decrements the count stored in the credit count 420 and transmits the read command to the DRAM 220(0) for processing. In response to the read command, the DRAM 220(0) transmits the read return data to the read return data buffer 412 at the target clock cycle. Because the read return data transmission is not scheduled on the L2 bus 402 at the target clock cycle, the read return data is stored in the read return data buffer 412 until the read return data can be transmitted to the L2 cache 350 at a later clock cycle, thereby resolving the read-read conflict.

If the count stored in the credit count 420 is less than the count stored in the credit count 424, then the available memory space in the read return data buffer 410 is less than the available memory space in the read return data buffer 438. The scheduling arbiter 410 decrements the credit count 424 and updates the bus schedule 403 to schedule the read return data transmission associated with read command on the L2 bus 402, replacing the previously scheduled read return data transmission. In this fashion, the read-read conflict is resolved. The read command is then transmitted to the DRAM 220(0) for processing. In response to the read command, the DRAM 220(0) transmits the read return data to the read return data buffer 412 at the target clock cycle. The L2 bus 402 retrieves the read return data from the read return data buffer 412 and transmits the read return data to the L2 cache 350 for further processing at the target clock cycle.

When processing a write command selected from the write command buffer 406, the scheduling arbiter 410 first determines whether a transmission of the data associated with the write command (herein referred to as "write data transmission") can be scheduled on the L2 bus 402. The write data needs to be retrieved from the L2 cache 350 via the L2 bus 402 a pre-determined number of clock cycles (again referred to herein as the "target clock cycle") after the scheduling arbiter 410 selects the write command from the write command buffer 406. The scheduling arbiter 410 examines the bus schedule 403 in the L2 bus 402 to determine whether another data transmission is scheduled on the L2 bus 402 at the target clock cycle.

When no data transmission is scheduled at the target clock cycle, then no conflicts exists, and the scheduling arbiter 410 transmits a write data request corresponding to the write command to the write data request buffer 430. The write data request includes the location within the L2 cache 350 where the write data associated with the write command is stored. The write data request is stored in the write data request buffer 430 until the write data request is selected for processing by the write data request arbiter 434 in a first-in-first-out fashion. The scheduling arbiter 410 also transmits the write command to the write command latency buffer 414. The write command is stored in the write command latency buffer 414 until the write command is selected for further processing by the write command issuer 418. At each clock cycle, the write command issuer 418 selects the write command stored at the top of the write command latency buffer 414. The write command issuer 418 then determines whether the write data associated with the selected write command is stored in the write data buffer 416. If so, then the write command issuer 418 transmits the write command and the write data the DRAM 220(0) for further processing. If not, then the write command issuer 418 stalls the write command until the data associated with the write command is available in the write data buffer 416.

If, however, the scheduling arbiter 410 determines that another data transmission is already scheduled on the L2 bus 402 at the target clock cycle, then the scheduling arbiter 410 determines whether that scheduled data transmission is a read return data transmission from the frame buffer logic to the L2 cache 350 (creating a write-read conflict) or a write data transmission from the L2 cache to the frame buffer logic (creating a write-write conflict).

With respect to a write-read conflict, such a conflict occurs when a read return data transmission from the first DRAM controller 408 or the second DRAM controller 422 is scheduled on the L2 bus 402 at the target clock cycle. In such cases, if the read return data is scheduled for transmission from the first DRAM controller 408, then the scheduling arbiter 410 retrieves the count stored in the credit count 420. If the count stored in the credit count 420 is equal to zero, then the scheduling arbiter 410 stalls the write command and attempts to schedule the write data transmission associated with the write command at the next clock cycle. If, however, the count stored in the credit count 420 is greater than zero, then the scheduling arbiter 410 decrements the count stored in the credit count 420, indicating the consumption of a credit. The scheduling arbiter 410 then updates the bus schedule 403 to un-schedule the previously scheduled read return data transmission, thereby resolving the write-read conflict. The scheduling arbiter 410 transmits the write command to the write command latency buffer 414. The scheduling arbiter 410 also transmits a write data request corresponding to the write command to the write data request buffer 430. The write data request is stored in the write data request buffer 430 until the write data request is selected for processing by the write data request arbiter 434 in a first-in-first-out fashion.

Also in the case of a write-read conflict, if the read return data is scheduled for transmission from the second DRAM controller 422, as opposed to being scheduled for transmission from the first DRAM controller 408, then the scheduling arbiter 410 retrieves the count stored in the credit count 424. If the count stored in the credit count 424 is equal to zero, then the scheduling arbiter 410 stalls the write command and attempts to schedule the write data transmission associated with the write command at the next clock cycle. If, however, the count stored in the credit count 424 is greater than zero, then the scheduling arbiter 410 decrements the count stored in the credit count 424, indicating the consumption of a credit.

The scheduling arbiter 410 then updates the bus schedule 403 to un-schedule the previously scheduled read return data transmission, thereby resolving the write-read conflict. The scheduling arbiter 410 transmits the write command to the write command latency buffer 414. The scheduling arbiter 410 also transmits a write data request corresponding to the write command to the write data request buffer 430. The write data request is stored in the write data request buffer 430 until the write data request is selected for processing by the write data request arbiter 434 in a first-in-first-out fashion.

The write data request arbiter 434 selects write data requests stored in the write data request buffer 430 transmitted by the scheduling arbiter 410 or write data requests stored in the write data request buffer 432 transmitted by the scheduling arbiter 436 in the second DRAM controller 422. The write data request buffer 430 and the write data request buffer 432 are first-in-first-out buffers, such that the write data request stored at the top of each of the write data request buffer 430 and the write data request buffer 432 should be processed at the earliest possible clock cycle.

With respect to a write-write conflict, such a conflict occurs if one or more write data requests are stored in both the write data request buffer 430 and the write data request buffer 432. In such cases, if the number of write data requests stored in the write data request buffer 430 is greater than or equal to the number of write data requests stored in the write data request buffer 432, then the write data request arbiter 434 selects the write data request stored at the top of the write data request buffer 430 for further processing. However, if the number of write data requests stored in the write data request buffer 432 is greater than the number of write data requests stored in the write data request buffer 430, then the write data request arbiter 434 selects the write data request stored at the top of the write data request buffer 432 for further processing. The write data request arbiter 434 updates the bus schedule 403 to schedule the write data transmission associated with the selected write data request on the target clock cycle. The write data request arbiter 434 then transmits the write data request to the L2 cache 350.

Once the read return data and write data transmissions have been scheduled, using the mechanisms set forth above, the L2 bus 402, at each clock cycle, examines the bus schedule 403 to determine whether read return data needs to be retrieved from the read return data buffer 412 in the first DRAM controller 408 or the read return data buffer 438 in the second DRAM controller 422 for transmission to the L2 cache 350. If a read return data transmission is scheduled for a given clock cycle, then the L2 bus 402 retrieves the read return data from the first DRAM controller 408 or the second DRAM controller 422 and transmits the read return data to the L2 cache 350. If not, then the L2 bus 402 examines the schedule of data transmissions stored in the bus schedule 403 to determine whether write data needs to be retrieved from the L2 cache 350 for transmission to the first DRAM controller 408 or the second DRAM controller 422. If a write data transmission is scheduled for a given clock cycle, then the L2 bus 402 retrieves the write data from the L2 cache 350 and transmits the write data to the write data buffer 416 in the first DRAM controller 408 or the write data buffer 442 in the second DRAM controller 422, as the case may be.

If no data transmission is scheduled for a given clock cycle, then the L2 bus 402 examines the counts stored in the credit count 420 and the credit count 424. If the count stored in the credit count 420 is less than or equal to the count stored in the credit count 424, then the L2 bus 402 retrieves read return data stored in the read return data buffer 412. The L2 bus 402 then increments the count stored in the credit count 420, indicating that one unit of memory space in the read return data buffer 412 is available for read return data associated with future read commands. If, however, the count stored in the credit count 424 is less than or equal to the count stored in the credit count 420, then the L2 bus 402 retrieves read return data stored in the read return data buffer included in the second DRAM controller 422. The L2 bus 402 then increments the count stored in the credit count 424. In this manner, read return data stored in the read return data buffer 412 or in the read return data buffer 438 for which a read return data transmission on the L2 bus 402 is not scheduled is retrieved by the L2 bus 402 on an available clock cycle.

Figure 5A:
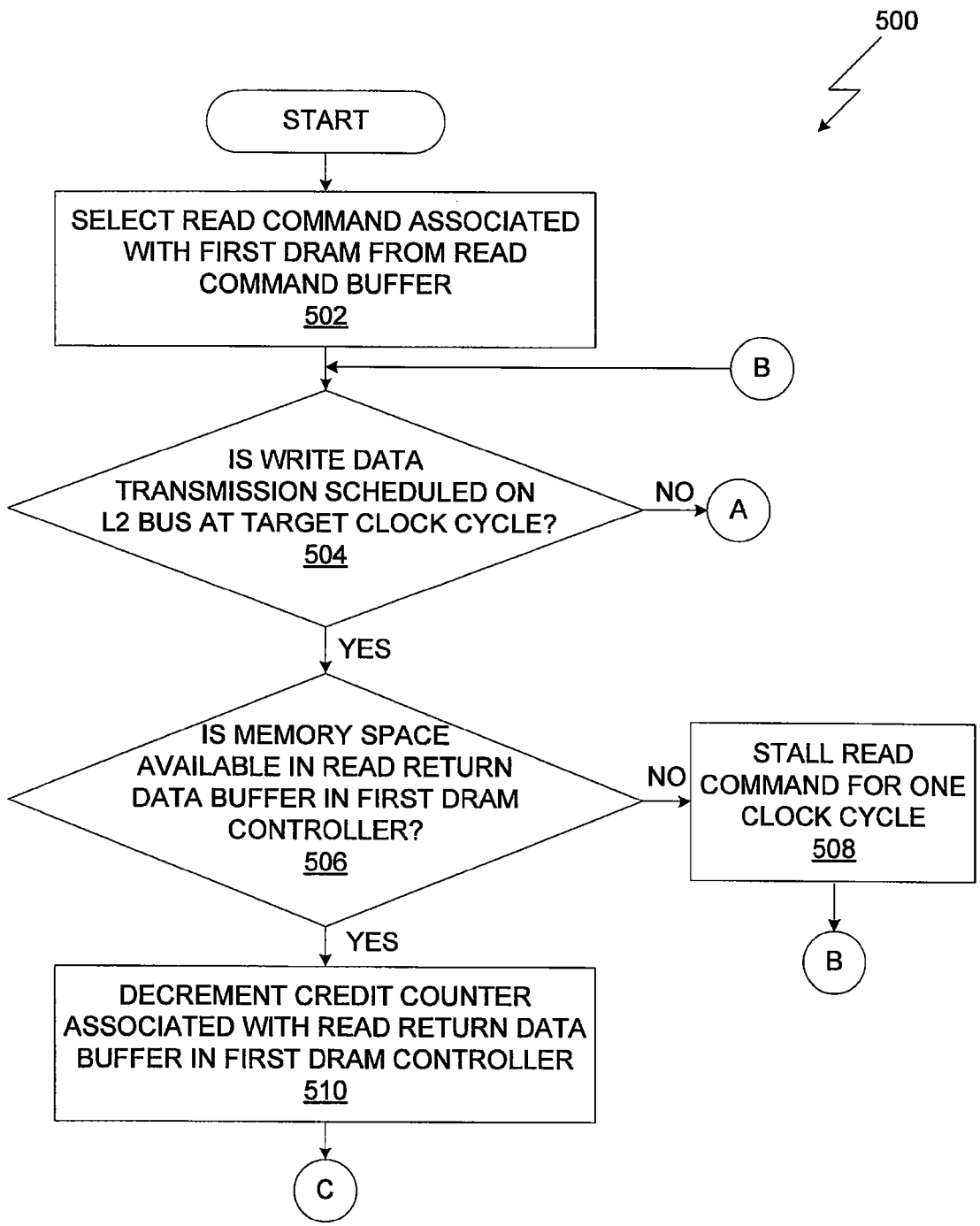
FIGS. 5A, 5B and 5C set forth a flow diagram of method steps for managing conflicts on the L2 bus when processing a read command, according to one embodiment of the present invention.
Figure 5B:
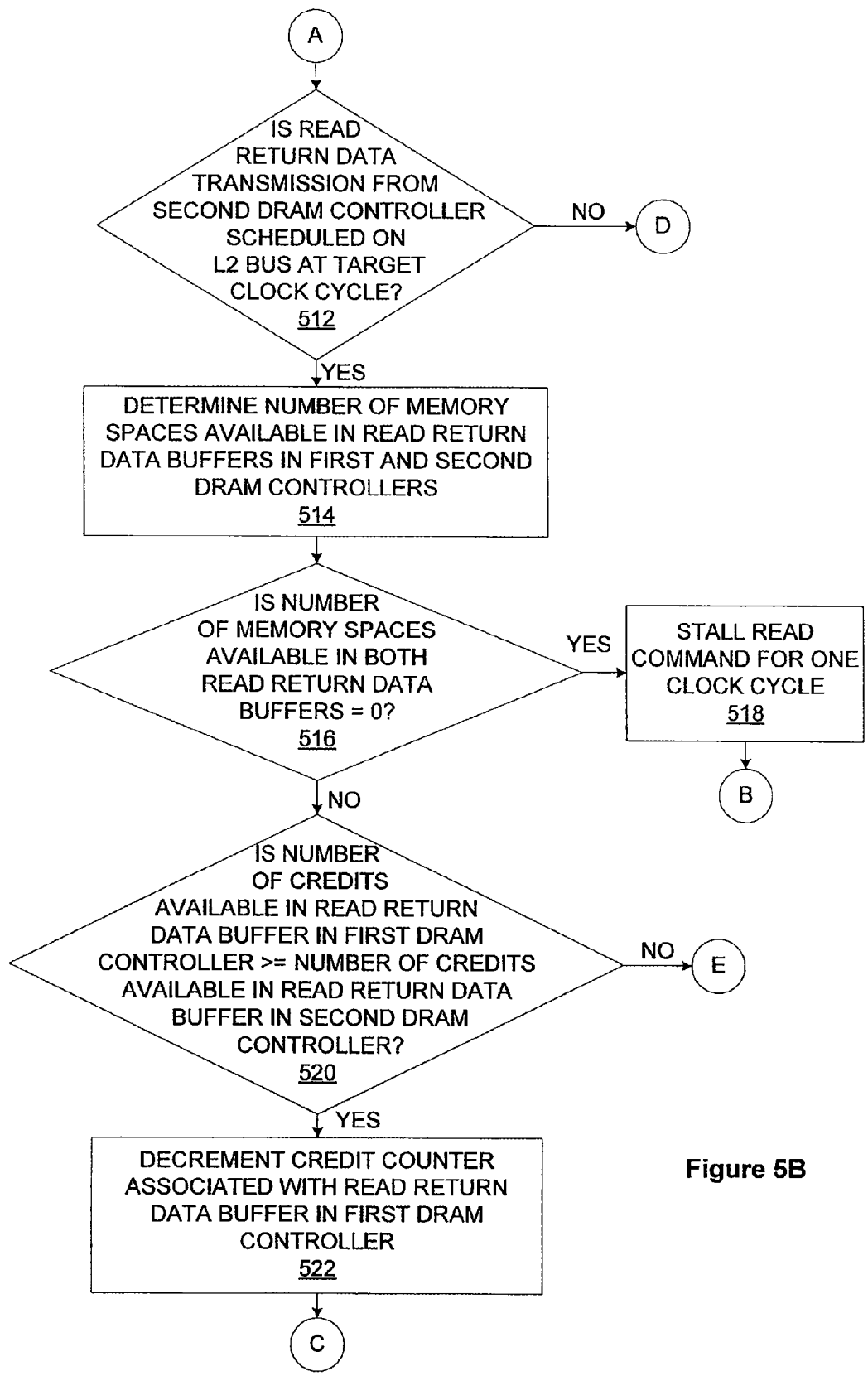
Figure 5C:
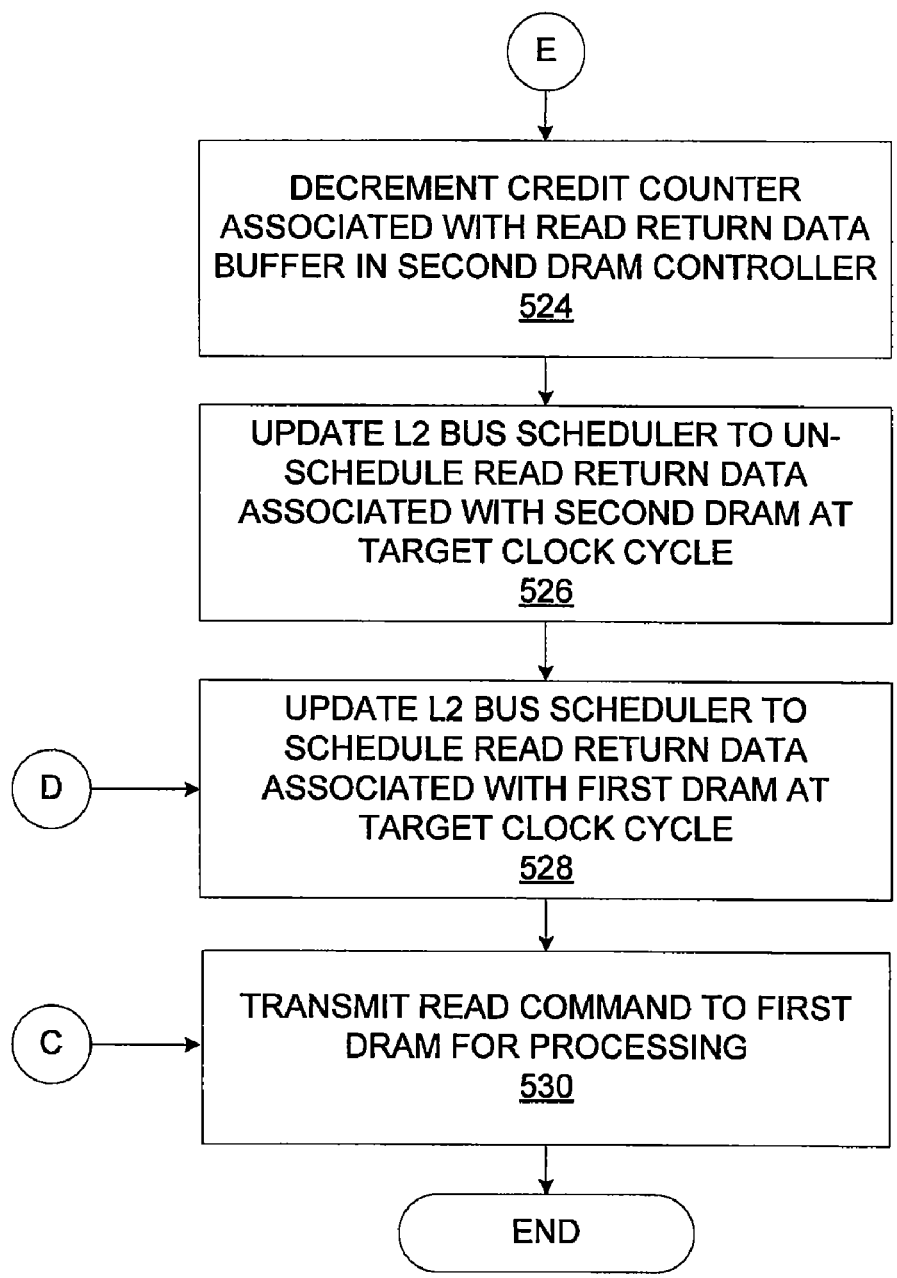

FIGS. 5A, 5B and 5C set forth a flow diagram of method steps for resolving conflicts on the L2 bus 402 when processing a read command, according to one embodiment of the present invention. Although the method steps are described in conjunction with FIGS. 1-4, persons skilled in the art will understand that any system configured to perform the method steps, in any order, falls within the scope of the present invention.

The method 500 begins at step 502, where the scheduling arbiter 410 in the first DRAM controller 408 selects a read command stored in the read command buffer 404. As described in conjunction with FIG. 4, the L2 cache 350 transmits read commands associated with the DRAM 220(0) to the read command buffer 404 requesting data stored in the DRAM 220(0). Again, the DRAM 220(0) transmits read return data at a pre-determined number of clock cycles, the target clock cycle, after the read command is issued to the DRAM 220(0). At step 504, the scheduling arbiter 410 examines the bus schedule 403 in the L2 bus 402 to determine whether a write data transmission is scheduled on the L2 bus 402 at the target clock cycle, thereby creating a read-write conflict.

In the case of a read-write conflict, the method 500 proceeds to step 506, where the scheduling arbiter 410 retrieves the count stored in the credit count 420, which indicates the number of memory spaces available in the read return data buffer 412 to store read return data. If the count stored in the credit count 420 is equal to zero, indicating that no memory space is available in the read return data buffer 412, then, at step 508, the scheduling arbiter 410 stalls the read command for one clock cycle. The method 500 then returns to step 504. If, however, at step 506, the count stored in the credit count 420 is greater than zero, indicating that memory space is available in the read return data buffer 412 to store read return data, then, at step 510, the scheduling arbiter 410 decrements the count stored in the credit count 420, indicating the consumption of a credit. In this fashion, the read-write conflict is resolved. The method 500 then proceeds directly to step 530, where the scheduling arbiter 410 transmits the read command to the DRAM 220(0) for processing. In response to the read command, the DRAM 220(0) transmits the read return data to the read return data buffer 412 at the target clock cycle.

Referring back now to step 504, if a write data transmission is not scheduled on the L2 bus 402 at the target clock cycle, then the method 500 proceeds directly to step 512. At step 512, the scheduling arbiter 410 examines the bus schedule 403 to determine whether a read return data transmission from the second DRAM controller 422 is scheduled on the L2 bus 402 at the target clock cycle, thereby creating a read-read conflict. In the case of a read-read conflict, the method 500 proceeds to step 514, where the scheduling arbiter 410 determines the number of credits available in the read return data buffer 412 and the read return data buffer 438 by examining the counts stored in the credit count 420 and the credit count 424.

At step 516, if both the counts stored in the credit count 420 and the credit count 424 are zero, indicating that no memory space is available in the read return data buffer 412 and the read return data buffer 438, then the method 500 proceeds to step 518. At step 518, the scheduling arbiter 410 stalls the read command for one clock cycle, and the method 500 then returns to step 504. If, at step 516, if either count is greater than zero, indicating that memory space is available in at least one of the read return data buffer 412 or the read return data buffer 438, then the method 500 proceeds to step 520.

At step 520, the scheduling arbiter 410 examines the counts stored in the credit count 420 and the credit count 424 to determine whether the memory space available in the read return data buffer 412 is greater than or equal to the memory space available in the read return data buffer 438. If so, then, at step 522, the scheduling arbiter 410 decrements the count stored in the credit count 420, indicating the consumption of a memory space in the read return data buffer 412. In this fashion, the read-write conflict is resolved. The method 500 then proceeds to step 530, previously described herein. However, if at step 520, the count stored in the credit count 420 is less than the count stored in the credit count 424, indicating that the memory space available in the read return data buffer 412 is less than the memory space available in the read return data buffer 438, then the method 500 proceeds to step 524.

At step 524, the scheduling arbiter 410 decrements the count stored in the credit count 424, indicating the consumption of a memory space in the read return data buffer 438. At step 526, the scheduling arbiter 410 updates the bus schedule 403 in the L2 bus 402 to un-schedule the previously scheduled read return data transmission from the second DRAM controller 422 at the target clock cycle. At step 528, the scheduling arbiter 410 updates the bus schedule 403 to schedule the read return data transmission associated with the read command selected at step 502 at the target clock cycle. In this fashion, the read-write conflict is resolved. The method then proceeds to step 530 previously described herein.

Referring back now to step 512, if a read return data transmission is not scheduled on the L2 bus 402, then no conflicts exist on the L2 bus 402 at the target clock cycle. In such a case, the method 500 proceeds directly to the step 528 previously described herein.

Figure 6A:
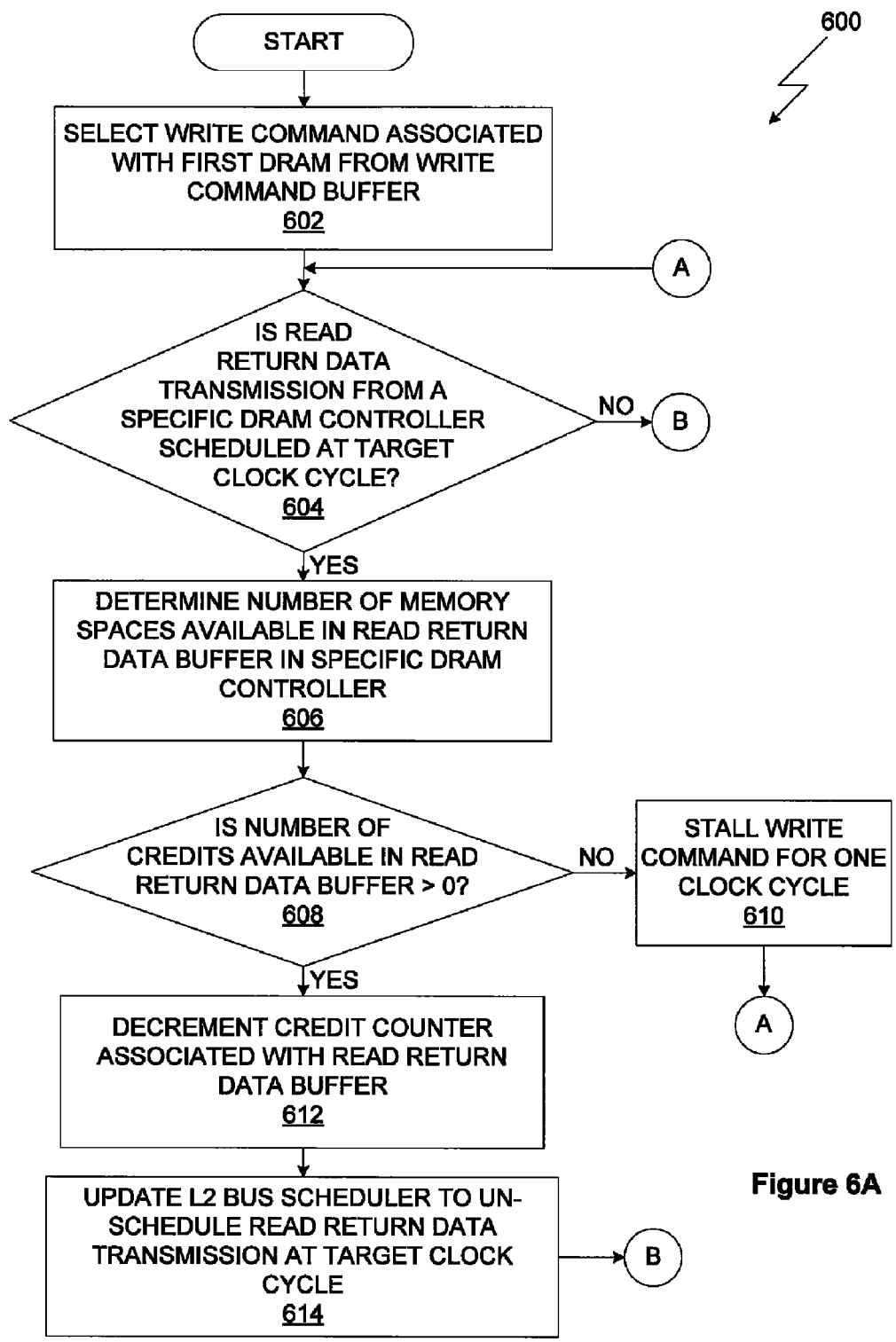
FIGS. 6A and 6B set forth a flow diagram of method steps for managing conflicts on the L2 bus when processing a write command, according to one embodiment of the present invention.
Figure 6B:
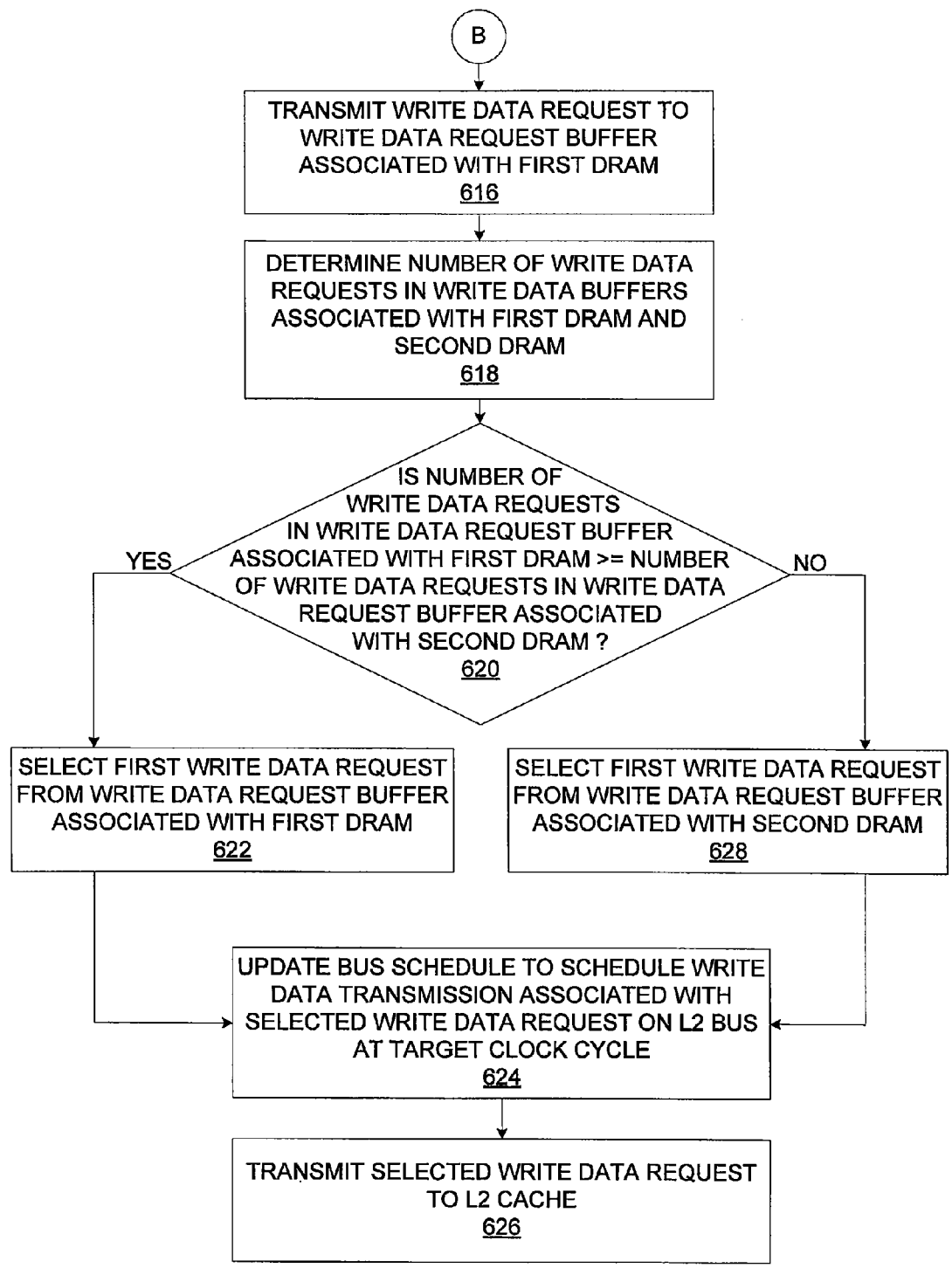

FIGS. 6A and 6B set forth a flow diagram of method steps for managing conflicts on the L2 bus 402 when processing a write command, according to one embodiment of the present invention. Although the method steps are described in conjunction with FIGS. 1-4, persons skilled in the art will understand that any system configured to perform the method steps, in any order, falls within the scope of the present invention.

The method 600 begins at step 602, where the scheduling arbiter 410 in the first DRAM controller 408 selects a write command stored in the write command buffer 406. As described in conjunction with FIG. 4, the L2 cache 350 transmits write commands associated with the DRAM 220(0) to the write command buffer 404 indicating that data stored in the L2 cache 350 needs to be transmitted to the DRAM 220(0) for storage. Again, the write data needs to be retrieved from the L2 cache 350 via the L2 bus 402 a pre-determined number of clock cycles, the target clock cycle, after the scheduling arbiter 410 selects the write command from the write command buffer 406. At step 604, the scheduling arbiter 410 examines the bus schedule 403 in the L2 bus 402 to determine whether a read return data transmission from the first DRAM controller 408 or the second DRAM controller 422 is scheduled on the L2 bus 402 at the target clock cycle, creating a write-read conflict.

In the case of a write-read conflict, the method 600 proceeds to step 606. At step 606, if the read return data transmission is from the first DRAM controller 408, then the scheduling arbiter 410 determines the number of memory spaces available in the read return data buffer 412 by examining the count stored in the credit count 420. At step 608, if count stored in the credit count 420 is equal to zero, indicating that there is no memory space available in the read return data buffer 412, then the method 500 proceeds to step 610. At step 610, the scheduling arbiter 410 stalls the write command for one clock cycle and the method 600 returns to step 604.

However, if at step 608, the count stored in the credit count 420 is greater than zero, indicating that memory space is available in the read return data buffer 412 to store read return data, then the method 600 proceeds to step 612. At step 612, the scheduling arbiter 410 decrements the count stored in the credit count 420, indicating the consumption of a memory space in the read return data buffer 412. At step 614, the scheduling arbiter 410 updates the bus schedule 403 in the L2 bus 402 to un-schedule the previously scheduled read return data transmission from the first DRAM controller 408 at the target clock cycle. In this fashion, the write-read conflict is resolved. The method 600 then proceeds to step 616.

Referring back to step 606, if the read return data transmission is from the second DRAM controller 422, then the scheduling arbiter 410 retrieves the count stored in the credit count 424, which indicates the number of memory spaces available to store read return data in the read return data buffer 438. At step 608, if the count stored in the credit count 424 is equal to zero, indicating that indicating that there is no memory space available in the read return data buffer 438, then the method 500 proceeds to step 610. At step 610, the scheduling arbiter 410 stalls the write command for one clock cycle and the method 600 returns to step 604.

However, if at step 608, the count stored in the credit count 424 is greater than zero, indicating that memory space is available in the read return data buffer 438 to store read return data, then the method 600 proceeds to step 612. At step 612, the scheduling arbiter 410 decrements the count stored in the credit count 424, indicating the consumption of a memory space in the read return data buffer 434. At step 614, the scheduling arbiter 410 updates the bus schedule 403 in the L2 bus 402 to un-schedule the previously scheduled read return data transmission from the second DRAM controller 422 at the target clock cycle. In this fashion, the write-read conflict is resolved. The method 500 then proceeds to step 616.

At step 616, the scheduling arbiter 410 transmits the write command selected at step 602 to the write data request buffer 430. At step 618, the write data request arbiter 434 determines the number of write data requests stored in the write data request buffer 430 and the write data request buffer 432. Again, the write data request buffer 430 stores write data requests transmitted by the scheduling arbiter 410, and the write data request buffer 432 stores write data requests transmitted by the scheduling arbiter 436. If, at any given clock cycle, both the write request buffer 430 and the write request buffer 432 store write data requests, then a write-write conflict exists.

At step 620, if the number of write data requests stored in the write data request buffer 430 is greater than or equal to the number of write data requests stored in the write data request buffer 432, then the method 600 proceeds to step 622. At step 622, the write data request arbiter 434 selects the first write data request stored in the write data request buffer 430 for further processing. At step 624, the write data request arbiter 434 updates the bus schedule 403 in the L2 bus 402 to schedule the write data transmission associated with the selected write data request at the target clock cycle. At step 626, the write data request arbiter 434 transmits the selected write data request to the L2 cache 350 for further processing. In this fashion, the write-write conflict is resolved.

However, if at step 620, the number of write data requests stored in the write data request buffer 430 is less than the number of write data requests stored in the write data request buffer 432, then the method 600 proceeds to step 628. At step 628, the write data request arbiter 434 selects the first write data request stored in the write data request buffer 432 for further processing. The method 600 then proceeds to step 624 and 626 previously described herein. In this fashion, the write-write conflict is resolved.

Figure 7A:
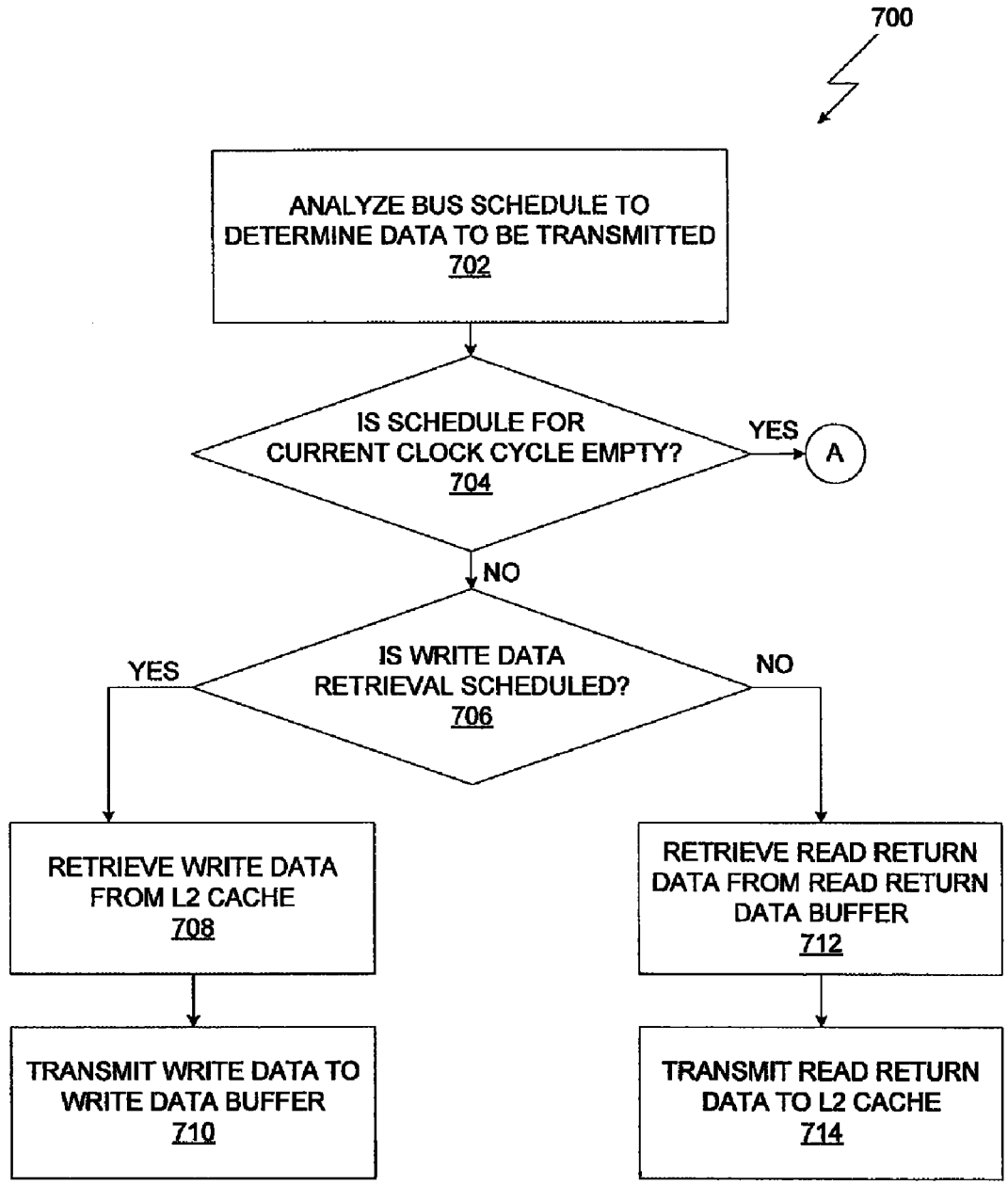
FIGS. 7A and 7B set forth a flow diagram of method steps for determining which data to transmit on the L2 bus based on the bus schedule stored in the L2 bus, according to one embodiment of the present invention.
Figure 7B:
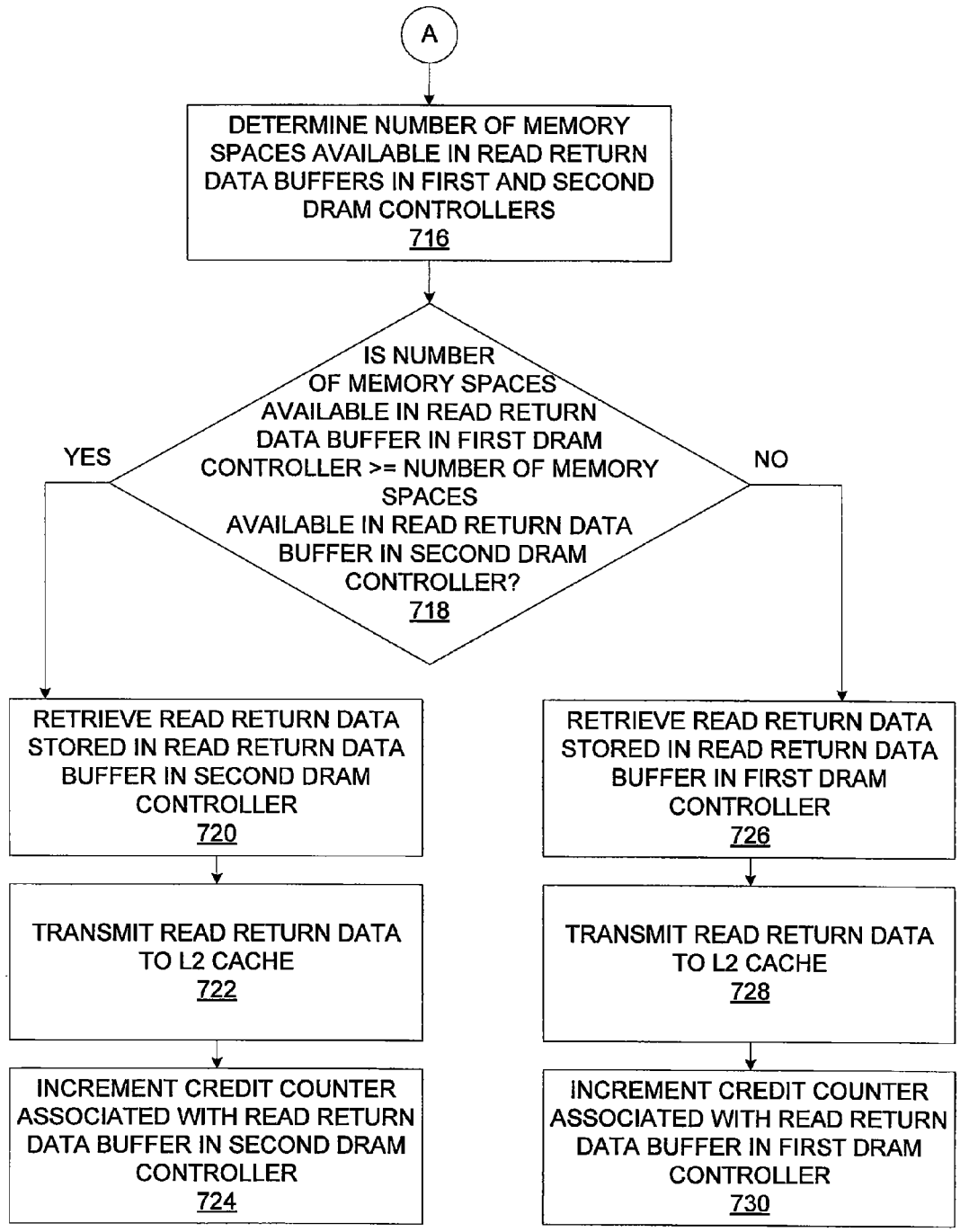

FIGS. 7A and 7B set forth a flow diagram of method steps for determining which data to transmit on the L2 bus 402 based on the bus schedule 403 stored in the L2 bus 402, according to one embodiment of the present invention. Although the method steps are described in conjunction with FIGS. 1-4, persons skilled in the art will understand that any system configured to perform the method steps, in any order, falls within the scope of the present invention.

The method 700 beings at step 702, where, at a given clock cycle, the L2 bus 402 analyzes the bus schedule 403 to determine the data transmission scheduled. At step 704, the L2 bus 402 determines whether no data transmission is scheduled at the given clock cycle. If there is a data transmission scheduled at the given clock cycle, then, at step 706, the L2 bus 402 determines whether the scheduled data transmission is a write data transmission from the L2 cache 350 to the write data buffer 416 or the write data buffer 442. If so, then, at step 708, the L2 bus 402 retrieves the write data corresponding to the scheduled write data transmission from the L2 cache 350. At step 710, the L2 bus 402 transmits the retrieved write data to either the write data buffer 416 or the write data buffer 442, as the case may be.

If, at step 706, the L2 bus 402 determines that the scheduled data transmission is a read return data transmission from the read return data buffer 412 or the read return data buffer 438 to the L2 cache 350, then the method 700 proceeds to step 712. At step 712, the L2 bus 402 retrieves the read return data corresponding to the scheduled read return data transmission from the read return data buffer 412 or the read return data buffer 438, as the case may be. At step 714, the L2 bus 402 transmits the retrieved read return data to the L2 cache 350.

Referring back now to step 704, if L2 bus 402 determines the no data transmission is scheduled at the given clock cycle, then the method 700 proceeds to step 716. At step 716, the L2 bus 402 examines the counts stored in the credit count 420 and the credit count 424 to determine the number of memory spaces available in the read return data buffer 412 and the read return data buffer 438. At step 718, if the L2 bus 402 determines that the count stored in the credit count 420 is greater than or equal to the count stored in the credit count 424, indicating that the memory space available in the read return data buffer 412 is greater than the memory space available in the read return data buffer 438, then the method 700 proceeds to step 720. At step 720, the L2 bus 402 retrieves read return data stored in the read return data buffer 438, and at step 722, the L2 bus 402 transmits the retrieved read return data to the L2 cache 350. At step 724, the L2 bus 402 increments the count stored in the credit count 424, indicating the availability of a memory space in the read return data buffer 438.

If, however, at step 718, the L2 bus 402 determines that the count stored in the credit count 420 is less than the count stored in the credit count 424, indicating that the memory space available in the read return data buffer 412 is less than the memory space available in the read return data buffer 438, then the method 700 proceeds to step 726. At step 726, the L2 bus 402 retrieves read return data stored in the read return data buffer 412, and at step 728, the L2 bus 402 transmits the retrieved read return data to the L2 cache 350. At step 730, the L2 bus 402 increments the count stored in the credit count 420, indicating the availability of a memory space in the read return data buffer 412.

In sum, read return data transmissions from different DRAMs to an L2 cache and write data transmissions from the L2 cache to the different DRAMs are scheduled on an L2 bus by a scheduling arbiter and a write data request arbiter. A bus schedule, included in the L2 bus, stores the data transmission schedule on the L2 bus for each clock cycle. The L2 bus, based on the bus schedule, retrieves data from the L2 cache or the different DRAMs, as required, for transmission.

To schedule a read return data transmission associated with a read command from a DRAM to the L2 cache at a given clock cycle, the scheduling arbiter first determines the schedule of data transmissions from the L2 bus scheduler. If no data transmission is scheduled at that clock cycle, then the scheduling arbiter updates the schedule stored within the L2 bus scheduler to schedule the read return data transmission. The scheduling arbiter then transmits the read command to the DRAM for processing. If, however, a data transmission is already scheduled on that clock cycle, then the scheduling arbiter determines whether the scheduled data transmission is a write data transmission (a read-write conflict) or a read return data transmission (a read-read conflict).

In the case of a read-write conflict, the scheduling arbiter determines the number of credits available in the read return data buffer associated with the DRAM. Each credit reflects one unit of memory space within the read return data buffer available to store read return data associated with a single read command. If no credits are available, then the command arbiter stalls the read command and attempts to schedule the read return data transmission associated with that read command on the next clock cycle. If, however, credits are available, then the scheduling arbiter decrements the credit count associated with the read return data buffer, indicating the consumption of a credit. The scheduling arbiter then transmits the read command to the DRAM for processing. If a credit is consumed when scheduling a read command, then the read return data transmission associated with the read command is not scheduled for transmission on the L2 bus. The read return data associated with the read command is stored in the read return data buffer until an available clock cycle arises on the L2 bus on which the read return data may be transmitted to the L2 cache.

In the case of a read-read conflict, the scheduling arbiter determines the number of credits available in the read return data buffers associated with both the DRAMs. If no credits are available in both the read return data buffers, then the scheduling arbiter stalls the read command and attempts to schedule the return data transmission associated with that read command on the next clock cycle. If credits are available in either of the read return data buffers, the scheduling arbiter determines if the number of credits available in the read return data buffer associated with the DRAM corresponding to the current read command is greater than the number of credits available in the read return data buffer associated with the DRAM for which the read return data transmission is already scheduled. If so, then the scheduling arbiter decrements the credit count associated with the read return data buffer associated with the DRAM corresponding to the current read command. If not, then the scheduling arbiter decrements the credit count associated with the read return data buffer associated with the DRAM for which the read return data transmission is already scheduled. The scheduling arbiter then updates the schedule within the L2 bus scheduler to schedule the read return data transmission associated with the current read command in place of the previously scheduled read return data transmission. The current read command is then transmitted to the DRAM corresponding to the current read command for processing.

To schedule a write data transmission associated with a write command from the L2 cache to a DRAM on a particular clock cycle, the scheduling arbiter first determines the schedule of data transmissions from the L2 bus scheduler on that clock cycle. If a data transmission is already scheduled on that clock cycle, then the scheduling arbiter determines whether the scheduled transmission is a read return data transmission from the frame buffer logic to the L2 cache 350 (creating a write-read conflict) or a write data transmission from the L2 cache to the frame buffer logic (creating a write-write conflict).

In the case of a write-read conflict, then the scheduling arbiter determines the number of credits available in the read return data buffer associated with the DRAM corresponding to the scheduled read return data transmission to store read return data. If no credits are available in the read return data buffer, then the command arbiter stalls the write command and attempts to schedule the write data transmission associated with that write command on the next clock cycle. If, however, credits are available in the read return data buffer, then the scheduling arbiter decrements the credit count associated with the read return data buffer, indicating the consumption of a credit. The scheduling arbiter then transmits the write command to the write data request buffer associated with the DRAM for further processing.

Write data requests are stored in the write data request buffers until the write data requests are selected for further processing by the write data request arbiter. At each clock cycle, the write data request arbiter determines the number of write data requests stored in each of the write data request buffers coupled to the write data request arbiter. The write data request selects the first write data request stored in the write data request buffer that stores the most write data requests. The write data requests arbiter then updates the schedule stored in the L2 bus schedule to schedule the write data transmission associated with the selected write data request.

At each clock cycle, the L2 bus scheduler examines the schedule of data transmissions to determine whether data needs to be retrieved from the L2 cache for transmission to a particular DRAM or whether data needs to be retrieved from a particular DRAM for transmission to the L2 cache. If no data transmission is scheduled, the L2 bus scheduler examines the credit counts associated with each of the read return data buffers. If read return data is stored in any of the read return data buffers, the L2 bus scheduler selects read return data from the read return data buffer with the lowest credit count for transmission to the L2 cache. The L2 bus scheduler then increments the credit count associated with the read return data buffer from which the read return data was selected.

One advantage of the disclosed method is that available memory space in the read return data buffers can be allocated to store read return data that should be transmitted to the L2 cache at a specific clock cycle when a conflict exists on the L2 bus at that specific clock cycle. Such a mechanism reduces the number of read or write commands that are stalled by the scheduling arbiter because the data transmissions associated with those read or write commands can not be scheduled due to conflicts on the L2 bus.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for scheduling a read return data transmission on a bus that couples an intermediary cache to frame buffer logic, wherein the frame buffer logic couples the intermediary cache to an external memory, and the read return data transmission involves transmitting read return data associated with a read command and retrieved from the external memory from the frame buffer logic to the intermediary cache, the method comprising:

determining a target clock cycle at which the read return data transmission should be scheduled on the bus;

examining a bus schedule to determine that a conflict on the bus exists between the read return data transmission and a previously scheduled data transmission at the target clock cycle;

resolving the conflict by consuming at least a portion of memory space available in a first buffer or a second buffer in the frame buffer logic for storing data retrieved from the external memory; and after resolving the conflict, transmitting the read command to the external memory to retrieve the read return data.

2. The method of claim 1, wherein the conflict is a read-write conflict, and the previously scheduled data transmission is a write data transmission that involves transmitting write data associated with a write command from the intermediary cache to the frame buffer logic on the bus, and the step of resolving the conflict comprises examining a count of a first counter in the frame buffer logic to determine an amount of memory space available in the first buffer for storing the read return data.

3. The method of claim 2, wherein the count of the first counter is equal to zero, and the step of resolving further comprises the step of stalling the read command.

4. The method of claim 2, wherein the count of the first counter is greater than zero, and step of resolving further comprises the step of decrementing the count of the first counter to indicate consumption of a portion of the memory space available in the first buffer.

5. The method of claim 1, wherein the conflict is a read-read conflict, and the previously scheduled data transmission is a second read return data transmission that involves transmitting read return data associated with a second read command and retrieved from the external memory from the frame buffer logic to the intermediary cache on the bus, and the step of resolving the conflict comprising examining counts of a first counter and a second counter within the frame buffer logic to determine which one of the first buffer or the second buffer has more memory space available.

6. The method of claim 5, wherein the counts of both the first counter and second counter are equal to zero, and the step of resolving further comprises the step of stalling the read command.

7. The method of claim 5, wherein the count of the first counter is greater than or equal to the count of the second counter, and the step of resolving further comprises decrementing the count of the first counter to indicate consumption of a portion of the memory space available in the first buffer.

8. The method of claim 5, wherein the count of the second counter is greater than the count of the first counter, and the step of resolving further comprises decrementing the count of the second counter to indicate consumption of a portion of the memory space available in the second buffer.

9. The method of claim 8, wherein the step of resolving the conflict further comprises the steps of un-scheduling the second read return data transmission, and updating the bus schedule to schedule the read return data transmission on the bus at the target clock cycle.

10. The method of claim 1, further comprising the steps of retrieving the read return data from the external memory, and storing the read return data in the first buffer.

11. The method of claim 1, further comprising the steps of examining the bus schedule to determine that the read return data transmission is scheduled at the target clock cycle, and retrieving the read return data from the first buffer for transmission to the intermediary cache on the bus at the target clock cycle.

12. The method of claim 1, further comprising the steps of examining the bus schedule to determine that no data transmission is scheduled at a second clock cycle, and examining counts of a first counter and a second counter to determine which one of the first buffer or the second buffer has more memory space available.

13. The method of claim 12, wherein the count of the first counter is less than or equal to the count of the second counter, and the step of examining the counts of the first counter and the second counter comprises the steps of retrieving the read return data from the first buffer for transmission to the intermediary cache on the bus at the second clock cycle, and incrementing the count of the first counter.

14. The method of claim 12, wherein the count of the second counter is less than the count of the first counter, and the step of examining the counts of the first counter and the second counter comprises the steps of retrieving a second read return data from the second buffer for transmission to the intermediary cache on the bus at the second clock cycle, and incrementing the count of the second counter.

15. A system configured for scheduling read return data transmissions on a bus, the system comprising:

an intermediary cache configured to store data and coupled to one or more clients; and frame buffer logic coupled to the intermediary cache via the bus and to an external memory and configured to retrieve read return data associated with a read command from the external memory and transmit the read return data to the intermediary cache on the bus via a read return data transmission, wherein the frame buffer logic includes:

a first buffer configured to store data retrieved from the external memory, a first counter having a count that reflects an amount of memory space available in the first buffer for storing data from the external memory, a second buffer configured to store data retrieved from the external memory, a second counter having a count that reflects an amount of memory space available in the second buffer for storing data from the external memory, and a scheduling arbiter configured to:
  determine a target clock cycle at which the read return data transmission should be scheduled on the bus,
  examine a bus schedule to determine that a conflict on the bus exists between the read return data transmission and a previously scheduled data transmission at the target clock cycle,
  resolve the conflict by consuming at least a portion of memory space available in the first buffer or the second buffer, and
  after resolving the conflict, transmit the read command to the external memory to retrieve the read return data.

16. The system of claim 15, wherein the conflict is a read-write conflict, and the previously scheduled data transmission is a write data transmission that involves transmitting write data associated with a write command from the intermediary cache to the frame buffer logic on the bus, and the scheduling arbiter is configured to resolve the conflict by examining the count of the first counter to determine an amount of memory space available in the first buffer for storing the read return data.

17. The system of claim 16, wherein the count of the first counter is equal to zero, and the scheduling arbiter is further configured to resolve the conflict by stalling the read command.

18. The system of claim 16, wherein the count of the first counter is greater than zero, and the scheduling arbiter is further configured to resolve the conflict by decrementing the count of the first counter to indicate consumption of a portion of the memory space available in the first buffer.

19. The system of claim 15, wherein the conflict is a read-read conflict, and the previously scheduled data transmission that involves transmitting read return data associated with a second read command and retrieved from the external memory from the frame buffer logic to the intermediary cache on the bus, and the scheduling arbiter is configured to resolve the conflict by examining the counts of the first counter and the second counter to determine which one of the first buffer or the second buffer has more memory space available.

20. The system of claim 19, wherein the count of the second counter is greater than to the count of the first counter, and the scheduling arbiter is further configured to resolve the conflict by decrementing the count of the second counter to indicate consumption of a portion of the memory space available in the second buffer.

21. The system of claim 20, wherein the scheduling arbiter is further configured to resolve the conflict by un-scheduling the second read return data transmission, and by updating the bus schedule to schedule the read return data transmission on the bus at the target clock cycle.

22. The system of claim 15, wherein the bus is configured to examine the bus schedule to determine that the read return data transmission is scheduled on the bus at the target clock cycle, and to retrieve the read return data from the first buffer for transmission to the intermediary cache on the bus at the target clock cycle.

23. The system of claim 15, wherein the bus is configured to examine the bus schedule to determine that no data transmission is scheduled at a second clock cycle, and to examine the counts of the first counter and the second counter to determine which one of the first buffer or the second buffer has more memory space available.

24. The system of claim 23, wherein the count of the first counter is less than or equal to the count of the second counter, and the bus is further configured to retrieve the read return data from the first buffer for transmission to the intermediary cache on the bus at the second clock cycle, and to increment the count of the first counter.

25. A computing device, comprising:
  one or more clients;
  an intermediary cache;
  a crossbar unit that couples the one or more clients to the intermediary cache;
  frame buffer logic coupled to the intermediary cache via a bus and coupled to an external memory;
  wherein the intermediary cache is configured to receive a read command from the one or more clients and to transmit the read command to the frame buffer logic,
  wherein the frame buffer logic is configured to retrieve read return data associated with the read command from the external memory and transmit the read return data to the intermediary cache on the bus via a read return data transmission, and the frame buffer logic includes:
    a first buffer configured to store data retrieved from the external memory,
    a first counter, having a count that reflects an amount of memory space available in the first buffer for storing data,
    a second buffer configured to store data retrieved from the external memory,
    a second counter having a count that reflects an amount of memory space available in the second buffer for storing data, and
    a scheduling arbiter configured to:
      determine a target clock cycle at which the read return data transmission should be scheduled on the bus,
      examine a bus schedule to determine that a conflict on the bus exists between the read return data transmission and a previously scheduled data transmission at the target clock cycle,
      resolve the conflict by consuming at least a portion of memory space available in the first buffer or the second buffer, and
      after resolving the conflict, transmit the read command to the external memory to retrieve the read return data.

* * * * *